(12) United States Patent  
Shinohara

(10) Patent No.: US 12,051,922 B2
(45) Date of Patent: Jul. 30, 2024

(54) POWER SUPPLY CIRCUIT

(71) Applicant: HONDA MOTOR CO., LTD., Tokyo (JP)

(72) Inventor: Sadao Shinohara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 178 days.

(21) Appl. No.: 17/590,833

(22) Filed: Feb. 2, 2022

(65) Prior Publication Data

US 2022/0263325 A1    Aug. 18, 2022

(30) Foreign Application Priority Data

Feb. 15, 2021   (JP) ................................ 2021-021453

(51) Int. Cl.
  *H02J 7/00*   (2006.01)
  *H02J 7/34*   (2006.01)

(52) U.S. Cl.
  CPC ........ *H02J 7/0029* (2013.01); *H02J 7/00032* (2020.01); *H02J 7/0013* (2013.01); *H02J 7/345* (2013.01)

(58) Field of Classification Search
  CPC .... H02J 7/0029; H02J 7/00032; H02J 7/0013; H02J 7/345; H02J 7/0063
  See application file for complete search history.

(56) References Cited

U.S. PATENT DOCUMENTS

| | | | | |
|---|---|---|---|---|
| 8,928,281 B2* | 1/2015 | Murase | ................. | H01M 50/51 320/122 |
| 10,205,315 B2* | 2/2019 | Mizoguchi | ............ | B60L 3/0069 |
| 10,723,236 B2* | 7/2020 | Tanaka | .................... | B60L 50/70 |
| 10,850,619 B2* | 12/2020 | Takegawa | ............... | H02P 27/08 |
| 2007/0258174 A1* | 11/2007 | Yamamoto | ........... | G11B 19/209 |
| 2008/0297128 A1* | 12/2008 | Xu | ..................... | H05B 45/3725 323/282 |
| 2014/0084940 A1* | 3/2014 | Abouda | ................. | G01R 31/50 324/538 |
| 2014/0306640 A1* | 10/2014 | Yamamoto | ............ | H02P 29/025 318/504 |
| 2016/0254749 A1* | 9/2016 | Kawakami | .............. | H02M 1/08 323/271 |
| 2017/0310142 A1* | 10/2017 | Watanabe | ............. | H02J 7/1438 |
| 2018/0194283 A1* | 7/2018 | Nishida | ................. | H05B 47/10 |
| 2019/0131804 A1* | 5/2019 | Taniguchi | ............. | B60R 16/033 |
| 2019/0168613 A1* | 6/2019 | Takegawa | ................. | B60L 3/00 |
| 2019/0304505 A1* | 10/2019 | Ogawa | ............... | G11B 20/1816 |
| 2021/0028633 A1* | 1/2021 | Kanou | ............... | G01R 31/3277 |
| 2021/0041035 A1* | 2/2021 | Sakamura | ............. | F15B 20/002 |

(Continued)

FOREIGN PATENT DOCUMENTS

JP         2006-042478         2/2006

*Primary Examiner* — Daniel Kessie
*Assistant Examiner* — Brian K Baxter
(74) *Attorney, Agent, or Firm* — Amin, Turocy & Watson, LLP

(57) ABSTRACT

In a power supply circuit in which a plurality of loads are connected in parallel to a common power source and load switches are provided for the respective loads, an abnormality determination unit determines which load switch has an abnormality among the plurality of load switches, based on time change of a potential difference acquired after a switch operation unit switches each load switch from OFF to ON.

5 Claims, 5 Drawing Sheets

(56) References Cited

U.S. PATENT DOCUMENTS

| | | | |
|---|---|---|---|
| 2021/0336463 A1* | 10/2021 | Yamabe | H02J 9/062 |
| 2021/0391736 A1* | 12/2021 | Li | H02J 7/0031 |
| 2022/0097634 A1* | 3/2022 | Morita | H02J 7/1423 |
| 2022/0140646 A1* | 5/2022 | Takahashi | H02J 1/084 |
| | | | 307/23 |

* cited by examiner

POWER SUPPLY CIRCUIT

CROSS-REFERENCE TO RELATED APPLICATIONS

This application is based upon and claims the benefit of priority from Japanese Patent Application No. 2021-021453 filed on Feb. 15, 2021, the contents of which are incorporated herein by reference.

BACKGROUND OF THE INVENTION

Field of the Invention

The present invention relates to a power supply circuit.

Description of the Related Art

JP 2006-042478 A discloses a distribution board in which a relay is provided for each of a plurality of loads.

SUMMARY OF THE INVENTION

JP 2006-042478 A does not disclose a technique for determining which relay among the plurality of relays has an abnormality. In the technique disclosed in JP 2006-042478 A, there is a problem that it takes time for work such as repair of the distribution board in a certain state. The "certain state" refers to a state in which a plurality of loads are connected in parallel to a common power source, a switch is provided for each of the plurality of loads, and it is not clear which switch has an abnormality.

The present invention has been made to solve the above problem, and an object thereof is to provide a power supply circuit capable of specifying a switch in which an abnormality has occurred, from among the switches provided for a plurality of loads.

According to an aspect of the present invention, there is provided a power supply circuit including: a power circuit including one or more power sources and a power switch connected in series with the power sources; a precharge circuit that is connected in parallel with the power switch and includes a precharge switch; a load circuit including a plurality of loads connected in parallel and load switches connected in series with the respective loads, the load circuit being connected to the power circuit; a potential difference acquisition unit configured to acquire a potential difference between a point on a positive-side wire connecting the power circuit and the load circuit and a point on a negative-side wire connecting the power circuit and the load circuit; a switch operation unit configured to perform an operation of switching between ON and OFF on the power switch, the precharge switch, and the plurality of load switches; and an abnormality determination unit configured to determine an abnormality of each of the plurality of load switches based on time change of the potential difference, wherein the switch operation unit switches the precharge switch from OFF to ON when the power switch and the load switches are in an OFF state, and thereafter sequentially switches the plurality of load switches, one by one, from OFF to ON, and the abnormality determination unit determines which load switch has an abnormality among the plurality of load switches, based on the time change of the potential difference after the switch operation unit has switched each of the load switches from OFF to ON.

According to the present invention, a switch in which an abnormality has occurred can be identified from among the switches provided respectively for a plurality of loads.

The above and other objects, features and advantages of the present invention will become more apparent from the following description when taken in conjunction with the accompanying drawings in which a preferred embodiment of the present invention is shown by way of illustrative example.

DESCRIPTION OF THE INVENTION

First Embodiment

Figure 1:
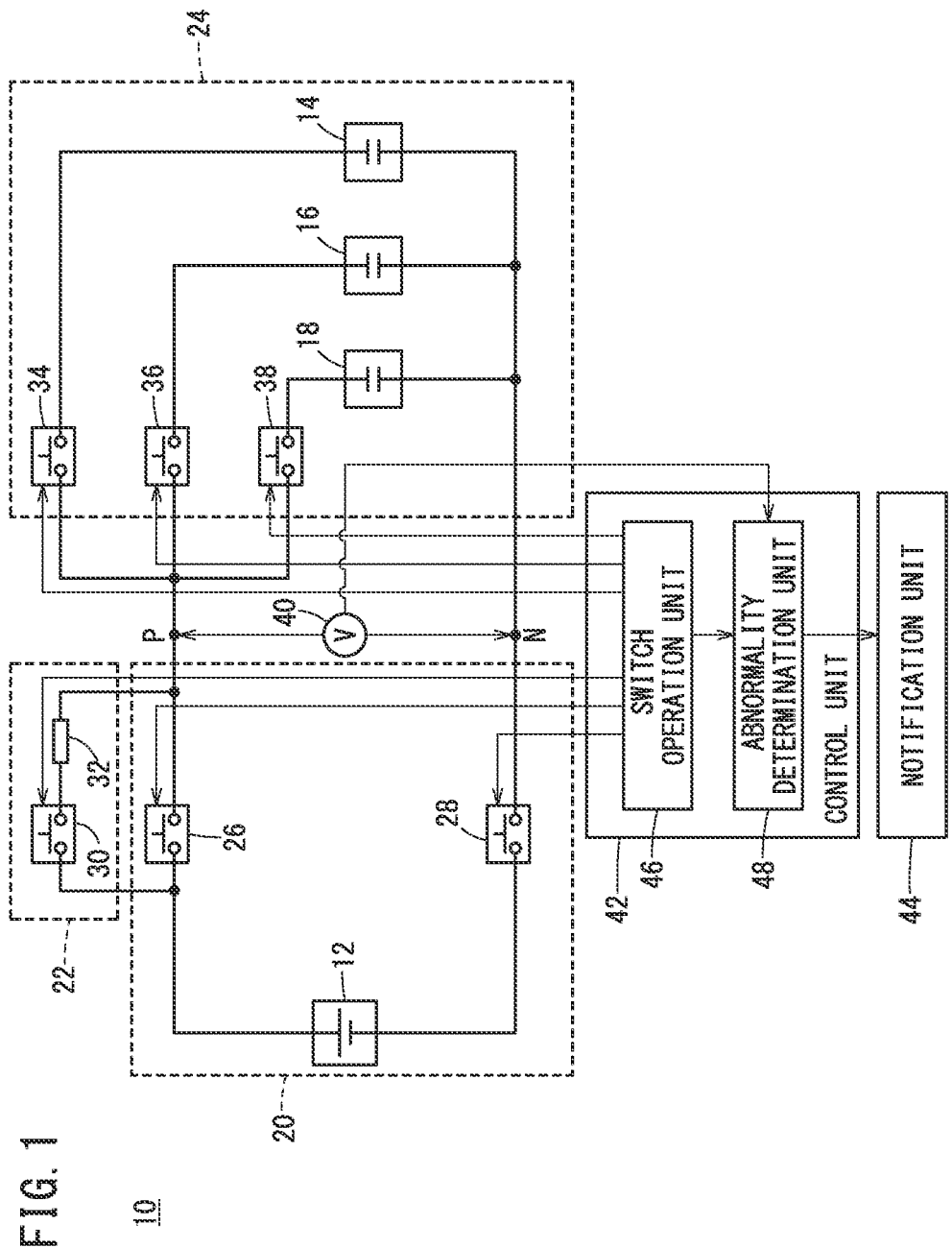
FIG. 1 is a view showing a configuration of a power supply circuit.

FIG. 1 is a diagram showing a configuration of a power supply circuit 10 according to the present embodiment.

The power supply circuit 10 supplies power from one power source 12 to three loads. The three loads are a first load 14, a second load 16, and a third load 18. The power supply circuit 10 includes a power circuit 20, a precharge circuit 22, and a load circuit 24. The power circuit 20 includes the power source 12. The load circuit 24 includes the first load 14, the second load 16, and the third load 18. The precharge circuit 22 is used when charging a capacitor in the first load 14, a capacitor in the second load 16, and a capacitor in the third load 18. There may be one or more power sources 12. There may be two loads. There may be four or more loads. The power supply circuit 10 may have any configuration as long as power can be supplied from a common power source to a plurality of loads connected in parallel with each other.

The power circuit 20 includes a power switch 26 connected in series with the positive electrode of the power source 12 and a power switch 28 connected in series with the negative electrode of the power source 12. The precharge circuit 22 is connected in parallel with the power switch 26.

The power switch 26 and the power switch 28 correspond to the power switch of the present invention. A state in which both the power switch 26 and the power switch 28 are turned on corresponds to a state in which the power switch of the present invention is turned on. A state in which the power switch 26 is turned off and the power switch 28 is turned on corresponds to a state in which the power switch of the present invention is turned off. The power switch 28 may be omitted from the power circuit 20.

The precharge circuit 22 includes a precharge switch 30 and a resistor 32. The resistor 32 is connected in series with the precharge switch 30. The load circuit 24 includes a first load switch 34, a second load switch 36, and a third load switch 38. The first load switch 34, the second load switch 36, and the third load switch 38 are connected in series with the first load 14, the second load 16, and the third load 18, respectively.

The power supply circuit 10 includes a voltmeter (potential difference acquisition unit) 40, a control unit 42, and a notification unit 44. The voltmeter 40 detects a voltage supplied from the power circuit 20 to the load circuit 24. More specifically, voltmeter 40 detects a potential difference between point P and point N. The point P is located on a wire on the positive side among a plurality of wires connecting the power circuit 20 and the load circuit 24. The point N is located on a wire on the negative side among the plurality of wires connecting the power circuit 20 and the load circuit 24. Hereinafter, when simply described as a potential difference, it indicates the potential difference detected by the voltmeter 40.

The control unit 42 includes a switch operation unit 46 and an abnormality determination unit 48. The switch operation unit 46 performs an operation of switching between ON and OFF on each of the power switch 26, the power switch 28, the precharge switch 30, the first load switch 34, the second load switch 36, and the third load switch 38.

The abnormality determination unit 48 determines an abnormality of the power switch 26, the first load switch 34, the second load switch 36, and the third load switch 38 according to time change of the potential difference. The abnormality in each of the first load switch 34, the second load switch 36, and the third load switch 38 includes an ON-sticking failure (in which a switch sticks to an ON state) and an OFF-sticking failure (in which a switch sticks to an OFF state).

When it is determined that at least one of the first load switch 34, the second load switch 36, and the third load switch 38 is abnormal, the abnormality determination unit 48 controls the notification unit 44 to notify the user that an abnormality has occurred in the power supply circuit 10. The notification unit 44 notifies the user of the occurrence of an abnormality by means of light, sound, characters, an image, or the like. The notification unit 44 may be provided outside the power supply circuit 10.

The abnormality determination unit 48 outputs, to the outside, information on a switch in which an abnormality has occurred, from among the first load switch 34, the second load switch 36, and the third load switch 38. Thus, for example, an external device that diagnoses the power supply circuit 10 can acquire information on a switch in which an abnormality has occurred.

The control unit 42 includes a calculation unit and a determination unit (not shown). The calculation unit and the determination unit can be realized by, for example, processing circuitry.

The processing circuitry may be configured by an integrated circuit such as an application specific integrated circuit (ASIC) or a field-programmable gate array (FPGA). Further, the processing circuitry may be configured by an electronic circuit including a discrete device.

Note that the processing circuitry may be configured by a processor such as a central processing unit (CPU) or a graphics processing unit (GPU). In this case, a processing circuitry can be realized by a processor executing a program stored in a storage unit (not illustrated).

[Method for Determining ON-Sticking Failure]

Figure 2:
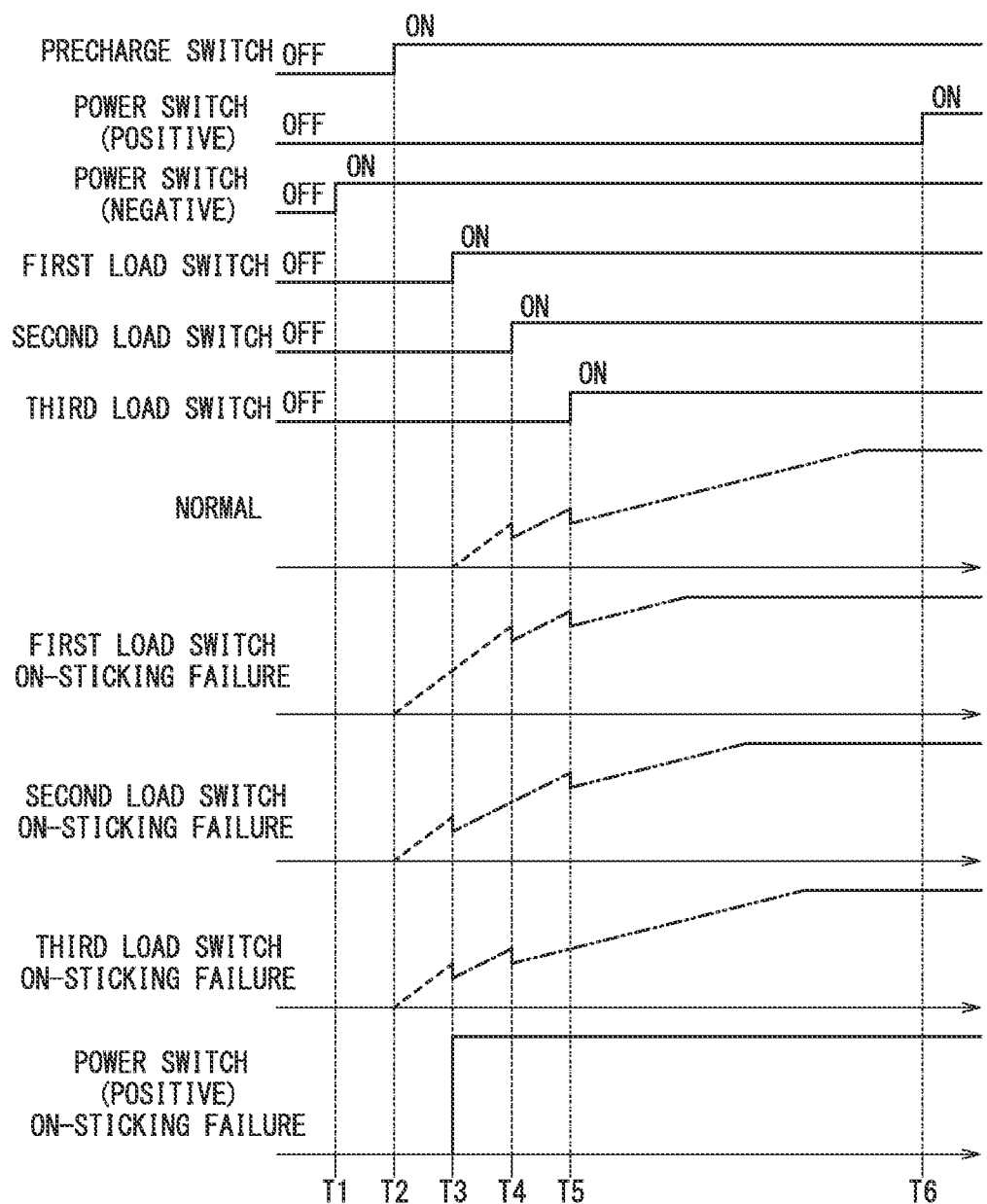
FIG. 2 is a diagram illustrating a method of determining a switch that has an ON-sticking failure.

FIG. 2 is a diagram illustrating a method of determining a switch that has an ON-sticking failure. The time chart shown in the upper part of FIG. 2 shows the timing of switching each switch between ON and OFF by the switch operation unit 46. The lower graphs of FIG. 2 show time change of the potential difference detected by the voltmeter 40. In FIG. 2, the power switch 26 is described as a power switch (positive), and the power switch 28 is described as a power switch (negative).

The switch operation unit 46 first turns OFF all of the precharge switch 30, the power switch 26, the power switch 28, the first load switch 34, the second load switch 36, and the third load switch 38. At time T1, the switch operation unit 46 operates the power switch 28 from OFF to ON. At time T2, the switch operation unit 46 operates the precharge switch 30 from OFF to ON. At time T3, the switch operation unit 46 operates the first load switch 34 from OFF to ON. At time T4, the switch operation unit 46 operates the second load switch 36 from OFF to ON. At time T5, the switch operation unit 46 operates the third load switch 38 from OFF to ON. At time T6, the switch operation unit 46 operates the power switch 26 from OFF to ON.

(Case where Switches are Normal)

The time change of the potential difference when all the switches are normal is as follows. The potential difference increases from the time T3 at which the first load switch 34 is operated from OFF to ON. At the time T4 at which the second load switch 36 is operated from OFF to ON, the potential difference rapidly decreases. Thereafter, the potential difference increases again. At the time T5 at which the third load switch 38 is operated from OFF to ON, the potential difference rapidly decreases. Thereafter, the potential difference increases again. When such time change of the potential difference is detected, the abnormality determination unit 48 determines that the precharge switch 30, the power switch 26, the power switch 28, the first load switch 34, the second load switch 36, and the third load switch 38 are normal.

The increase rate of the potential difference has a correlation with the number of loads having a capacitor that is being charged. From time T3 to time T4, the load in a state where the capacitor is being charged is the first load 14. That is, in a time period from the time T3 to the time T4, the number of the loads in a state where the capacitor is being charged is one. The increase rate of the potential difference at this time is hereinafter referred to as a first increase rate. In the time chart of FIG. 2, a change with time of the potential difference at the first increase rate is indicated by a dashed line. Also in the time charts of FIGS. 3 to 5 which will be described later, the time change of the potential difference at the first increase rate is indicated by a dashed line.

From the time T4 to the time T5, the number of the loads whose capacitors are being charged is two, i.e., the first load 14 and the second load 16. The increase rate of the potential difference at this time is hereinafter referred to as a second increase rate. The second increase rate is smaller than the first increase rate. In the time charts of FIG. 2 and FIGS. 3 to 5 which will be described later, time change of the potential difference according to the second increase rate is indicated by a dot-dashed line.

After the time T5, the number of the loads whose capacitors are being charged is three, i.e., the first load 14, the second load 16, and the third load 18. The increase rate of the potential difference at this time is hereinafter referred to as a third increase rate. The third increase rate is smaller than the second increase rate. In the time charts of FIG. 2 and FIGS. 3 to 5 which will be described later, time change of the potential difference according to the third increase rate is indicated by a two-dot-dashed line.

(Case where One Load Switch has ON-Sticking Failure)

The time change of the potential difference when the first load switch 34 has an ON-sticking failure is as follows. The potential difference increases at the first increase rate from the time T2 at which the precharge switch 30 is turned on. After the time T3 when the first load switch 34 is turned on, the potential difference still increases at the first increase rate. At the time T4 at which the second load switch 36 is turned on, the potential difference rapidly decreases. After the potential difference rapidly decreases, the potential difference increases at the second increase rate. When such time change of the potential difference is detected, the abnormality determination unit 48 determines that the first load switch 34 has an ON-sticking failure.

The time change of the potential difference when the second load switch 36 has an ON-sticking failure is as follows. The potential difference increases at the first increase rate from the time T2 at which the precharge switch 30 is turned on. At the time T3 when the first load switch 34 is turned on, the potential difference rapidly decreases. After the potential difference rapidly decreases, the potential difference increases at the second increase rate. After the time T4 at which the second load switch 36 is turned on, the potential difference increases at the second increase rate. When such time change of the potential difference is detected, the abnormality determination unit 48 determines that the second load switch 36 has an ON-sticking failure.

The change over time of the potential difference when the third load switch 38 has an ON-sticking failure is as follows. The potential difference increases at the first increase rate from the time T2 at which the precharge switch 30 is turned on. At the time T3 at which the first load switch 34 is turned on, the potential difference rapidly decreases. After the potential difference rapidly decreases, the potential difference increases at the second increase rate. At the time T4 at which the second load switch 36 is turned on, the potential difference rapidly decreases. After the potential difference rapidly decreases, the potential difference increases at the third increase rate. After the time T5 at which the third load switch 38 is turned on, the potential difference increases at the third increase rate. When such time change of the potential difference is detected, the abnormality determination unit 48 determines that the third load switch 38 has an ON-sticking failure.

The time change of the potential difference when the power switch 26 has an ON-sticking failure is as follows. At the time T3 at which the first load switch 34 is turned on, the potential difference rapidly increases, and charging of the capacitor provided in the first load 14 is completed. When such time change of the potential difference is detected, the abnormality determination unit 48 determines that the power switch 26 has an ON-sticking failure.

(Case where Plurality of Switches have ON-Sticking Failure)

Figure 3:
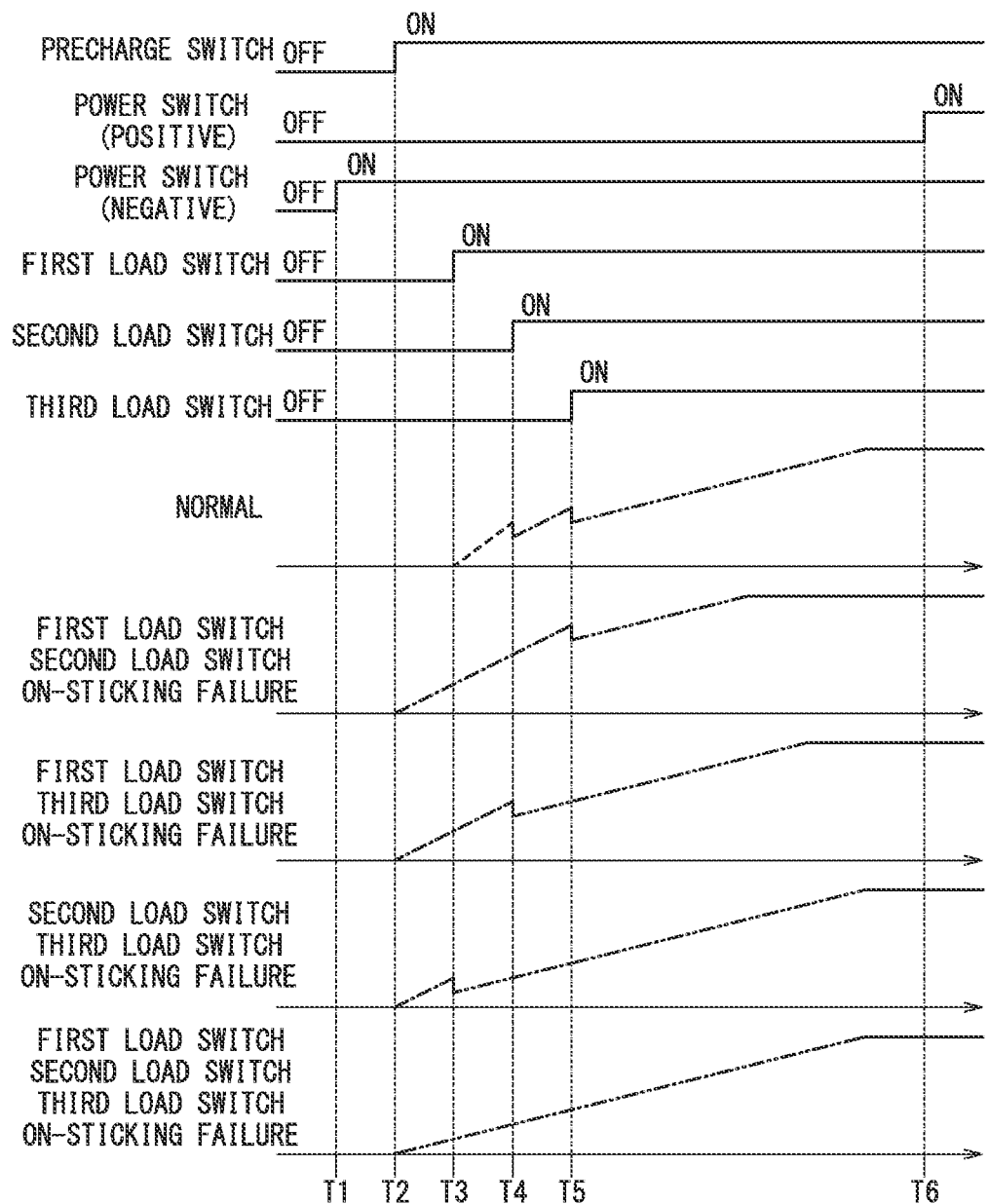
FIG. 3 is a diagram illustrating a method of determining switches that have an ON-sticking failure.

FIG. 3 is a diagram illustrating a method of determining switches that have an ON-sticking failure. The time chart shown in an upper part of FIG. 3 shows the timing at which each switch is turned on or off by the switch operation unit 46. The lower graphs of FIG. 3 show time change of the potential difference detected by the voltmeter 40. The timing of turning on or off each switch by the switch operation unit 46 is the same as the timing shown in FIG. 2. In FIG. 3, the power switch 26 is described as a power switch (positive electrode), and the power switch 28 is described as a power switch (negative electrode).

The change over time of the potential difference when the first load switch 34 and the second load switch 36 have an ON-sticking failure is as follows. The potential difference increases at the second increase rate from the time T2 at which the precharge switch 30 is turned on. After the time T3 at which the first load switch 34 is turned on, the potential difference increases at the second increase rate. After the time T4 at which the second load switch 36 is turned on, the potential difference increases at the second increase rate. At the time T5 when the third load switch 38 is turned on, the potential difference rapidly decreases. After the potential difference rapidly decreases, the potential difference increases again at the third increase rate. When such time change of the potential difference is detected, the abnormality determination unit 48 determines that two switches, i.e., the first load switch 34 and the second load switch 36, have an ON-sticking failure.

The time change of the potential difference when the first load switch 34 and the third load switch 38 have an ON-sticking failure is as follows. The potential difference increases at the second increase rate from the time T2 at which the precharge switch 30 is turned on. After the time T3 at which the first load switch 34 is turned on, the potential difference increases at the second increase rate. At the time T4 at which the second load switch 36 is turned on, the potential difference rapidly decreases. After the potential difference rapidly decreases, the potential difference increases again at the third increase rate. When such time change of the potential difference is detected, the abnormality determination unit 48 determines that two switches, i.e., the first load switch 34 and the third load switch 38, have an ON-sticking failure.

The time change of the potential difference when the second load switch 36 and the third load switch 38 have an ON-sticking failure is as follows. The potential difference increases at the second increase rate from the time T2 at which the precharge switch 30 is turned on. At the time T3 at which the first load switch 34 is turned on, the potential difference rapidly decreases. After the potential difference rapidly decreases, the potential difference increases again at the third increase rate. When such time change of the potential difference is detected, the abnormality determination unit 48 determines that two switches, i.e., the second load switch 36 and the third load switch 38, have an ON-sticking failure.

The time change of the potential difference when the first load switch 34, the second load switch 36, and the third load switch 38 have an ON-sticking failure is as follows. The potential difference increases at the third increase rate from the time T2 at which the precharge switch 30 is turned on. In a case where such time change of the potential difference is detected, the abnormality determination unit 48 determines that three switches, i.e., the first load switch 34, the second load switch 36 and the third load switch 38, have an ON-sticking failure.

(Determination of Number of Switches Having ON-Sticking Failure)

The abnormality determination unit 48 determines the number of switches that have an ON-sticking failure, according to the increase rate of the potential difference after the time point T2 at which the precharge switch 30 is turned on.

As shown in FIG. 2, the time change of the potential difference when one of the first load switch 34, the second load switch 36, and the third load switch 38 has an ON-sticking failure is as follows. That is, the potential difference increases at the first increase rate from the time T2 at which the precharge switch 30 is turned on.

As shown in FIG. 3, the time change of the potential difference when two of the first load switch 34, the second load switch 36, and the third load switch 38 has an ON-sticking failure is as follows. That is, the potential difference increases at the second increase rate from the time T2 at which the precharge switch 30 is turned on.

As shown in FIG. 3, the time change of the potential difference when all of the first load switch 34, the second load switch 36, and the third load switch 38 has an ON-sticking failure is as follows. That is, the potential difference increases at the third increase rate from the time T2 at which the precharge switch 30 is turned on.

[Method for Determining OFF-Sticking Failure]
(Case where One Switch has OFF-Sticking Failure)

Figure 4:
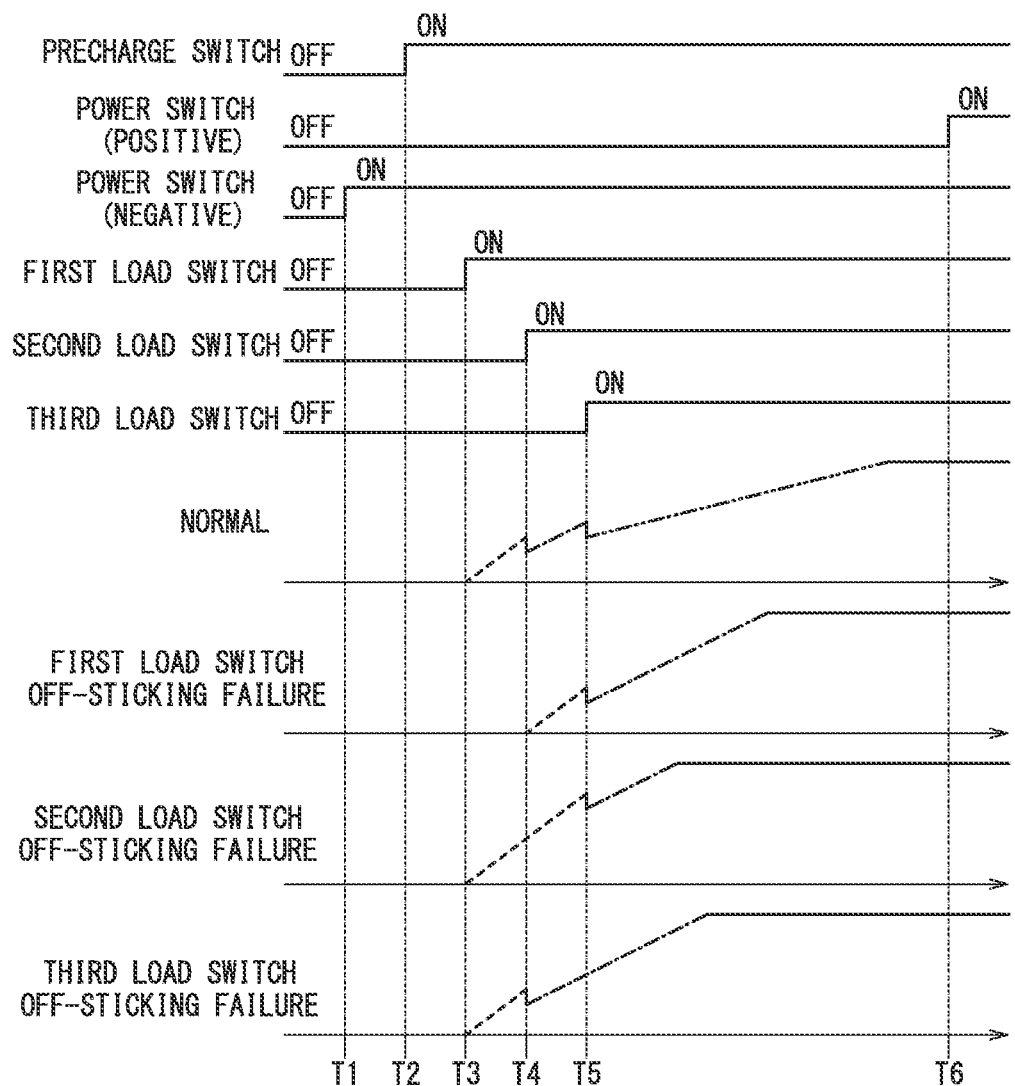
FIG. 4 is a diagram illustrating a method of determining a switch that has an OFF-sticking failure.

FIG. 4 is a diagram illustrating a method of determining a switch that has an OFF-sticking failure. The time chart shown in an upper part of FIG. 4 shows the timing at which each switch is turned on or off by the switch operation unit 46. The lower graphs of FIG. 4 show time change of the potential difference detected by the voltmeter 40. The timing of turning on or off each switch by the switch operation unit 46 is the same as the timing shown in FIG. 2. In FIG. 4, the power switch 26 is described as a power switch (positive electrode), and the power switch 28 is described as a power switch (negative electrode).

The time change of the potential difference when the first load switch 34 has an OFF-sticking failure is as follows. At the time T3 at which the first load switch 34 is turned on, the potential difference does not increase. The potential difference starts to increase at the first increase rate from the time T4 at which the second load switch 36 is turned on. At the time T5 at which the third load switch 38 is turned on, the potential difference rapidly decreases. After the potential difference rapidly decreases, the potential difference increases again at the second increase rate. When such time change of the potential difference is detected, the abnormality determination unit 48 determines that the first load switch 34 has an OFF-sticking failure.

The time change of the potential difference when the second load switch 36 has an OFF-sticking failure is as follows. The potential difference increases at the first increase rate from the time T3 when the first load switch 34 is turned on. After the time T4 when the second load switch 36 is turned on, the potential difference increases at the first increase rate. At the time T5 at which the third load switch 38 is turned on, the potential difference rapidly decreases. After the potential difference rapidly decreases, the potential difference increases again at the second increase rate. When such time change of the potential difference is detected, the abnormality determination unit 48 determines that the second load switch 36 has an OFF-sticking failure.

The time change of the potential difference when the third load switch 38 has an OFF-sticking failure is as follows. The potential difference increases at the first increase rate from the time T3 when the first load switch 34 is turned on. At the time T4 at which the second load switch 36 is turned on, the potential difference rapidly decreases. After the potential difference rapidly decreases, the potential difference increases again at the second increase rate. After the time T5 at which the third load switch 38 is turned on, the potential difference increases at the second increase rate. When such time change of the potential difference is detected, the abnormality determination unit 48 determines that the third load switch 38 has an OFF-sticking failure.

(Case where Plurality of Switches have OFF-Sticking Failure)

Figure 5:
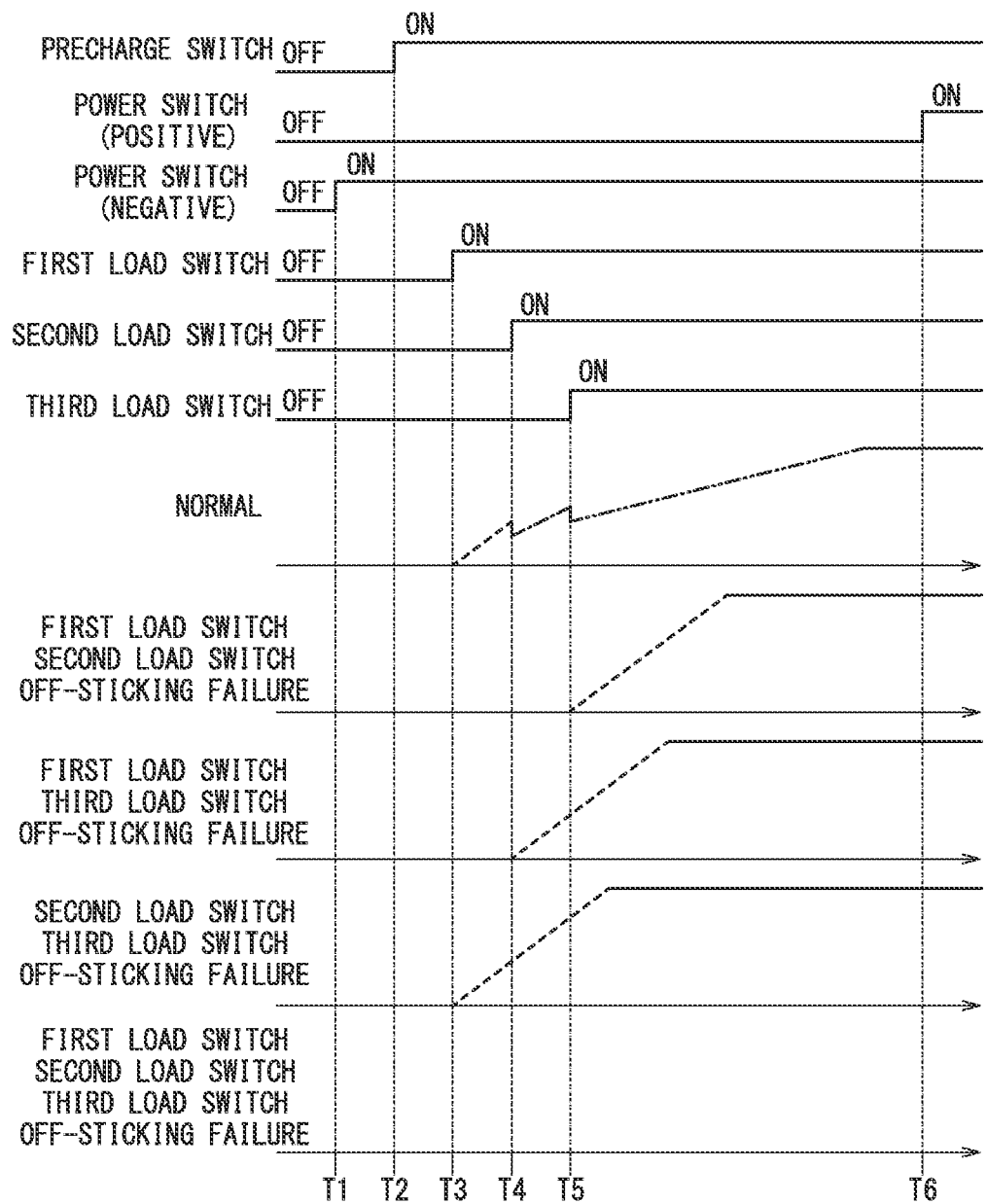
FIG. 5 is a diagram illustrating a method of determining switches that have an OFF-sticking failure.

FIG. 5 is a diagram illustrating a method of determining switches that have an OFF-sticking failure. The time chart shown in an upper part of FIG. 5 shows the timing at which each switch is turned on or off by the switch operation unit 46. The lower graphs of FIG. 5 show time change of the potential difference detected by the voltmeter 40. The timing of turning on or off each switch by the switch operation unit 46 is the same as the timing shown in FIG. 2. In FIG. 5, the power switch 26 is described as a power switch (positive electrode), and the power switch 28 is described as a power switch (negative electrode).

The time change of the potential difference when the first load switch 34 and the second load switch 36 have an OFF-sticking failure is as follows. At the time T3 at which the first load switch 34 is turned on, the potential difference does not increase. At the time T4 when the second load switch 36 is turned on, the potential difference still does not increase. The potential difference starts to increase at the first increase rate at the time T5 when the third load switch 38 is turned on. When such time change of the potential difference is detected, the abnormality determination unit 48 determines that two switches, i.e., the first load switch 34 and the second load switch 36, have an OFF-sticking failure.

The time change of the potential difference when the first load switch 34 and the third load switch 38 have an OFF-sticking failure is as follows. At the time T3 at which the first load switch 34 is turned on, the potential difference does not increase. The potential difference starts to increase at the first increase rate from the time T4 at which the second load switch 36 is turned on. After the time T5 at which the third load switch 38 is turned on, the potential difference increases at the first increase rate. When such time change of the potential difference is detected, the abnormality determination unit 48 determines that two switches, i.e., the first load switch 34 and the third load switch 38, have an OFF-sticking failure.

The time change of the potential difference when the second load switch 36 and the third load switch 38 have an OFF-sticking failure is as follows. The potential difference increases at the first increase rate from the time T3 when the first load switch 34 is turned on. After the time T4 when the second load switch 36 is turned on, the potential difference increases at the first increase rate. After the time T5 when the third load switch 38 is turned on, the potential difference increases at the first increase rate. In a case where such time change of the potential difference is detected, the abnormality determination unit 48 determines that two switches, i.e., the second load switch 36 and the third load switch 38, have an OFF-sticking failure.

When the first load switch 34, the second load switch 36, and the third load switch 38 have an OFF-sticking failure, the potential difference does not increase at the time T3 at which the first load switch 34 is turned on. At the time T4 when the second load switch 36 is turned on, the potential difference does not increase. At the time T5 when the third load switch 38 is turned on, the potential difference does not increase. In a case where such time change of the potential difference is detected, the abnormality determination unit 48 determines that three switches, i.e., the first load switch 34, the second load switch 36 and the third load switch 38, have an OFF-sticking failure.

[Operational Effects]

In the power supply circuit 10 of the present embodiment, a plurality of loads are connected in parallel to a common power source. Further, in the power supply circuit 10 of the present embodiment, a switch is provided for each load. In the power supply circuit 10 of the present embodiment, since the switch in which the abnormality occurs can be specified, it is possible to shorten the time of work such as repair of the power supply circuit 10.

In the power supply circuit 10 of the present embodiment, the switch operation unit 46 turns off the power switch 26, the first load switch 34, the second load switch 36, and the third load switch 38. In this state, the switch operation unit 46 turns the precharge switch 30 from OFF to ON. The switch operation unit 46 sequentially switches the first load switch 34, the second load switch 36, and the third load switch 38, from OFF to ON, one by one, in sequence. The abnormality determination unit 48 determines which of the first load switch 34, the second load switch 36, and the third load switch 38 has an abnormality. This determination is made based on the time change of the potential difference after each of the first load switch 34, the second load switch 36, and the third load switch 38 is operated from OFF to ON. Accordingly, the power supply circuit 10 can identify a switch in which an abnormality has occurred.

In the power supply circuit 10 of the present embodiment, the abnormality determination unit 48 determines the number of switches in which an abnormality has occurred among the first load switch 34, the second load switch 36, and the third load switch 38. This determination is performed based on time change of the potential difference after the precharge switch 30 is operated from OFF to ON. Thus, the power supply circuit 10 can determine the number of switches in which an abnormality has occurred.

In the power supply circuit 10 of the present embodiment, the abnormality determination unit 48 determines whether the abnormality occurring in the switch is an ON-sticking failure or an OFF-sticking failure. This determination is made based on time change of the potential difference after the switch operation unit 46 has turned the first load switch 34, the second load switch 36, and the third load switch 38 from OFF to ON. Thus, the power supply circuit 10 can determine the type of abnormality that has occurred in the switch.

In the power supply circuit 10 of the present embodiment, when the abnormality determination unit 48 determines that at least one of the first load switch 34, the second load switch 36, and the third load switch 38 is abnormal, the abnormality determination unit 48 controls the notification unit 44 to notify the user that an abnormality has occurred in the power supply circuit 10. Thus, it is possible to notify the user that an abnormality has occurred in the power supply circuit 10.

In addition, in the power supply circuit 10 according to the present embodiment, the abnormality determination unit 48 outputs, to the outside, information on a switch determined to have an abnormality. Thus, the external device can acquire information on the switch in which the abnormality has occurred.

[Technical Ideas Obtained from Embodiments]

Technical ideas that can be grasped from the above-described embodiments are described below.

A power supply circuit (10) includes: a power circuit (20) including one or more power sources (12) and a power switch (26) connected in series with the power sources; a precharge circuit (22) that is connected in parallel with the power switch and includes a precharge switch (30); a load circuit (24) including a plurality of loads (14, 16, 18) connected in parallel and load switches (34, 36, 38) connected in series with the respective loads, the load circuit being connected to the power circuit; a potential difference acquisition unit (40) configured to acquire a potential difference between a point on a positive-side wire connecting the power circuit and the load circuit and a point on a negative-side wire connecting the power circuit and the load circuit; a switch operation unit (46) configured to perform an operation of switching between ON and OFF on each switch, i.e., each of the power switch, the precharge switch, and the load switches; and an abnormality determination unit (48) configured to determine an abnormality of each of the plurality of load switches based on time change of the potential difference. The switch operation unit switches the precharge switch from OFF to ON when the power switch and the load switches are in an OFF state, and thereafter sequentially switches the plurality of load switches, one by one, from OFF to ON. The abnormality determination unit determines which load switch has an abnormality among the plurality of load switches, based on the time change of the potential difference after the switch operation unit has switched each of the load switches from OFF to ON.

In the above-described power supply circuit, the abnormality determination unit may determine the number of the load switches in which an abnormality has occurred, according to the time change of the potential difference after the precharge switch has been switched from OFF to ON.

In the above-described power supply circuit, the abnormality determination unit may determine whether the abnormality is an ON-sticking failure or an OFF-sticking failure for the load switch determined to have an abnormality among the plurality of load switches, based on the time change of the potential difference after the switch operation unit has switched each of the load switches from OFF to ON.

In the above-described power supply circuit, the abnormality determination unit may control a notification unit (44) to give notification when it is determined that at least one of the plurality of load switches has an abnormality.

In the above-described power supply circuit, the abnormality determination unit may output information of the load switch determined to have an abnormality, to the outside.

The present invention is not particularly limited to the embodiment described above, and various modifications are possible without departing from the essence and gist of the present invention.

What is claimed is:
1. A power supply circuit comprising:
   a power circuit comprising one or more power sources and a power switch connected in series with the one or more power sources;
   a precharge circuit that is connected in parallel with the power switch and comprises a precharge switch;
   a load circuit comprising a plurality of loads connected in parallel and load switches connected in series with the plurality of loads, respectively, the load circuit being connected to the power circuit;
   a potential difference acquisition unit configured to acquire a potential difference between a point on a positive-side wire connecting the power circuit and the load circuit and a point on a negative-side wire connecting the power circuit and the load circuit;
   a switch operation unit configured to perform an operation of switching between ON and OFF on the power switch, the precharge switch, and the load switches; and
   an abnormality determination unit configured to read the potential difference acquired by the potential difference acquisition unit and to determine whether an abnormality has occurred in each of the load switches based on a time change of the potential difference,
   wherein:
   the switch operation unit switches the precharge switch from OFF to ON while the power switch and the load switches are in an OFF state, and thereafter sequentially switches the load switches, one by one, from OFF to ON; and the abnormality determination unit determines whether the abnormality has occurred in each of the load switches based on the time change of the potential difference after the switch operation unit has switched each of the load switches from OFF to ON.

2. The power supply circuit according to claim 1, wherein the abnormality determination unit determines a number of the load switches in which the abnormality has occurred according to the time change of the potential difference after the precharge switch has been switched from OFF to ON.

3. The power supply circuit according to claim 1, wherein the abnormality determination unit determines whether the abnormality is an ON-sticking failure or an OFF-sticking failure concerning the load switch determined to have the abnormality based on the time change of the potential difference after the switch operation unit has switched each of the load switches from OFF to ON.

4. The power supply circuit according to claim 1, wherein the abnormality determination unit controls a notification unit to give notification in response to determining that at least one of the plurality of load switches has the abnormality.

5. The power supply circuit according to claim 1, wherein the abnormality determination unit outputs information of the load switch determined to have the abnormality to an external device.

* * * * *

UNITED STATES PATENT AND TRADEMARK OFFICE
CERTIFICATE OF CORRECTION

PATENT NO. : 12,051,922 B2
APPLICATION NO. : 17/590833
DATED : July 30, 2024
INVENTOR(S) : Shinohara It is certified that error appears in the above-identified patent and that said Letters Patent is hereby corrected as shown below:

In the Claims

Claim 4, Column 11, Line 22:
It should read ..."at least one of the load switches has the..."

Signed and Sealed this
Tenth Day of September, 2024

Katherine Kelly Vidal
*Director of the United States Patent and Trademark Office*